United States Patent

Tajima et al.

[11] Patent Number: 5,868,541
[45] Date of Patent: Feb. 9, 1999

[54] HORIZONTAL GOODS TRANSFER APPARATUS

[75] Inventors: Empei Tajima, Matsudo; Yoshiro Yamaguchi, Abiko; Jyunjirou Kanazuka, Usiku, all of Japan

[73] Assignee: Nippon Filing Co., Ltd., Tokyo, Japan

[21] Appl. No.: 791,957

[22] Filed: Jan. 31, 1997

[51] Int. Cl.$^6$ .................................................. B65G 25/02
[52] U.S. Cl. .................... 414/276; 414/286; 198/774.2
[58] Field of Search .................. 414/276, 286, 414/531, 750; 198/774.2

[56] References Cited

U.S. PATENT DOCUMENTS

| | | | |
|---|---|---|---|
| 4,357,128 | 11/1982 | Gooden et al. | 198/774.2 X |
| 4,395,183 | 7/1983 | Wirholm et al. | 198/774.2 X |
| 5,123,517 | 6/1992 | Windau | 414/276 X |
| 5,228,819 | 7/1993 | Hammond | 414/286 X |
| 5,605,427 | 2/1997 | Hammond | 414/276 |
| 5,727,669 | 3/1998 | Rich, Jr. | 414/750 X |

FOREIGN PATENT DOCUMENTS

| | | | |
|---|---|---|---|
| 3734777 | 4/1989 | Germany | 198/774.2 |
| 2-31449 | 8/1990 | Japan . | |
| 4153110 | 5/1992 | Japan | 414/276 |
| 5-47128 | 12/1993 | Japan . | |
| 8702129 | 4/1989 | Netherlands | 414/531 |

*Primary Examiner*—James W. Keenan
*Attorney, Agent, or Firm*—Joseph Scafetta, Jr.

[57] ABSTRACT

A horizontal goods transfer apparatus includes a horizontal fixed rail extending in the back-and-forth direction and being capable of mounting thereon a plurality of items in a row in the longitudinal direction. A back-and-forth movement rail is arranged to be substantially parallel to the fixed rail and is placed to be reciprocally movable in the back-and-forth direction. A reciprocating air cylinder moves the back-and-forth movement rail for a predetermined distance. A vertical movement rail is supported by the back-and-forth movement rail to be vertically movable and capable of being located at an upper position higher than the fixed rail and a lower position lower than the fixed rail. A flexible tube is placed on the back-and-forth movement rail and under the vertical movement rail to extend along the vertical movement rail. This flexible tube is inflated/deflated upon supply/discharge of compressed air, thereby vertically moving the vertical movement rail to the upper and lower positions.

8 Claims, 15 Drawing Sheets

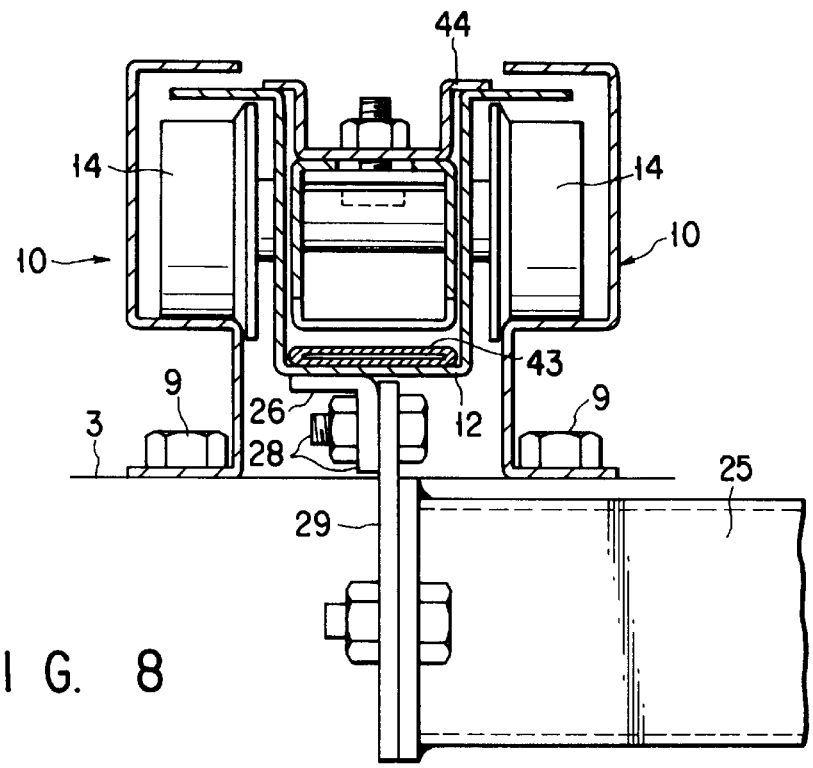
F I G. 8
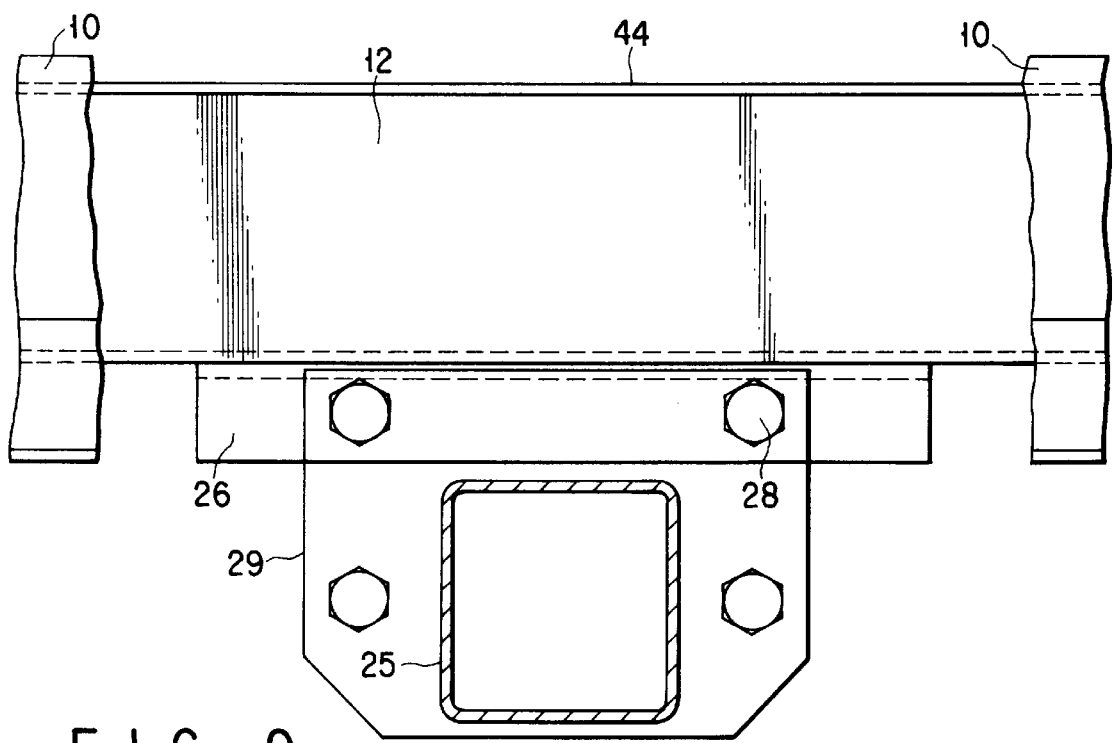
F I G. 9

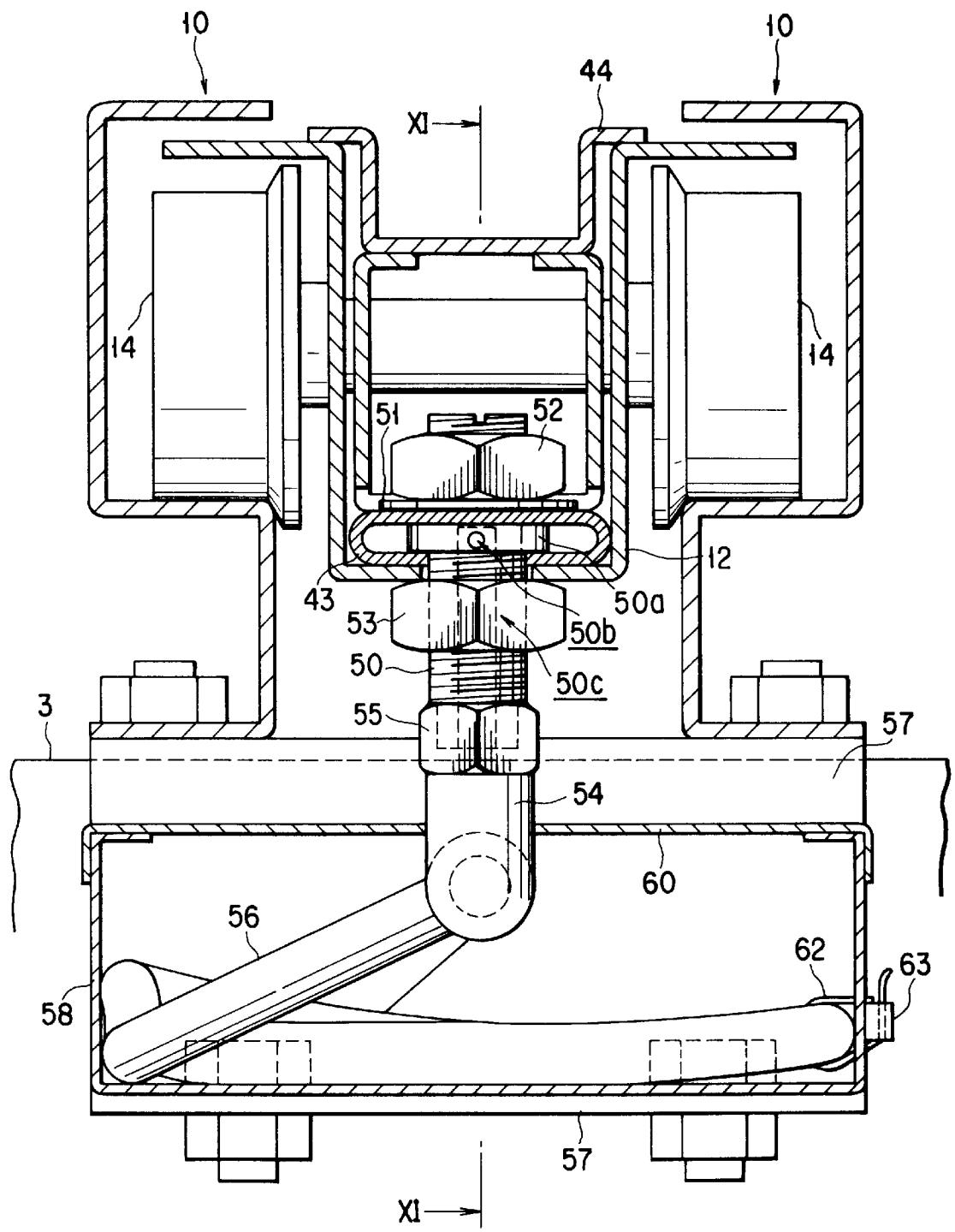
F I G. 10

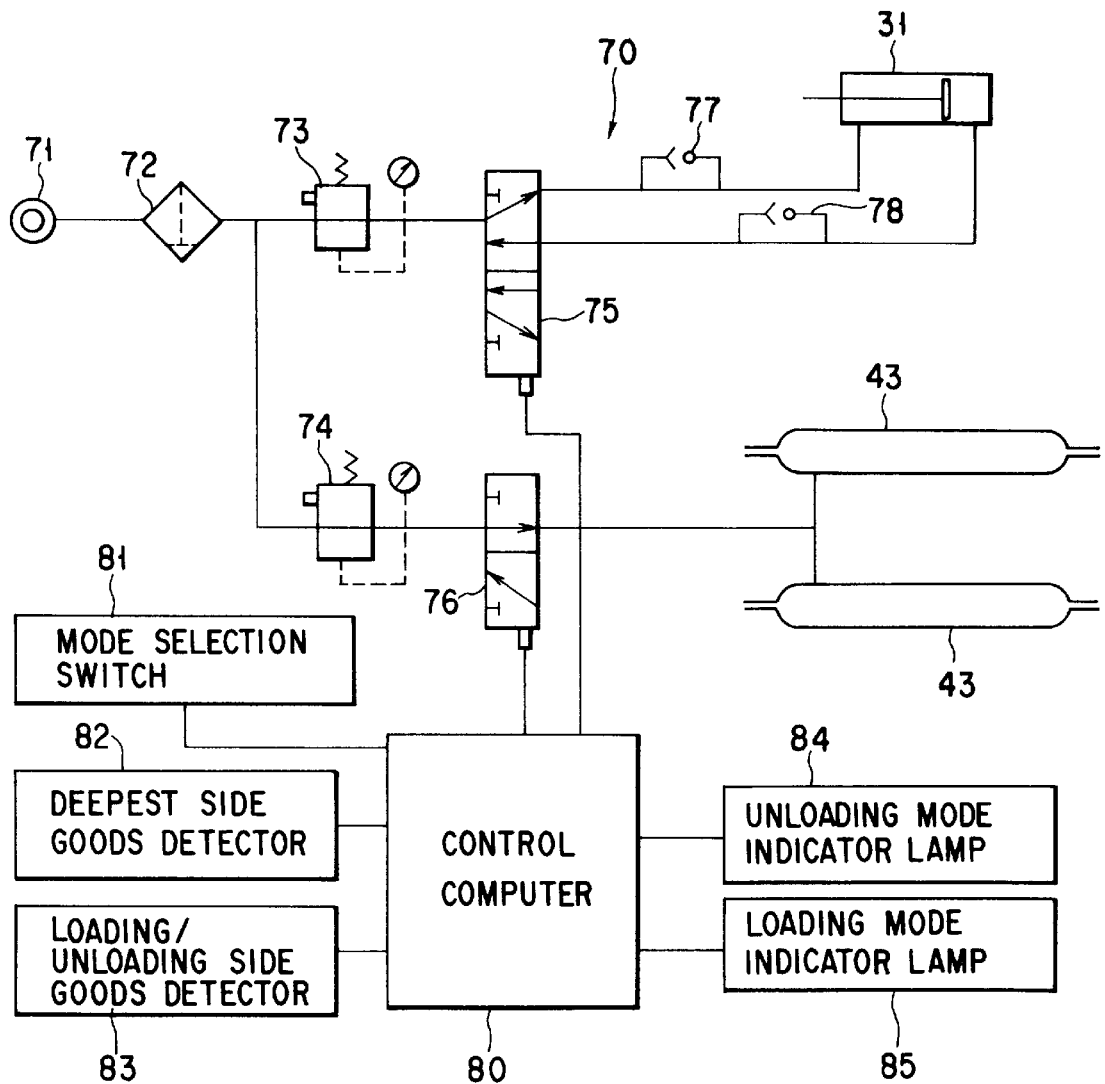
F I G. 14

HORIZONTAL GOODS TRANSFER APPARATUS

BACKGROUND OF THE INVENTION

The present invention relates to an improvement in a horizontal goods transfer apparatus for mounting goods on its elongated rail and intermittently transferring the goods.

As is known well, an example of the horizontal goods transfer apparatus of this type includes a conveyor that merely transfers goods and a flow-through rack that performs both transfer and storage of goods. Regarding the flow-through rack of these two examples, one shown in Jpn. UM Appln. KOKOKU Publication No. 2-31449 is filed by the present applicant as a prior art.

The flow-through rack indicated in this publication has fixed rails, vertical movement rails installed along the fixed rails to move upward/downward upon inflation/deflation of a flexible tube, and back-and-forth movement rails supported by the vertical movement rails to be movable back and forth with a predetermined stroke to move upward/downward together with the vertical movement rails.

An item of goods is placed on the fixed rails, and the flexible tube is inflated to move the vertical movement rails upward. The goods item placed on the fixed rails is lifted by the back-and-forth movement rails moved upward together with the vertical movement rails, so that it floats from the fixed rails.

Thereafter, the back-and-forth movement rails mounting the goods item thereon are moved forward by an amount corresponding to their stroke, thereby moving the vertical movement rails downward. Then, the back-and-forth movement rails are moved downward together with the vertical movement rails. The goods item is transferred from the back-and-forth movement rails to the fixed rails. As a result, the goods item is moved forward by an amount corresponding to the stroke of the back-and-forth movement rails.

The back-and-forth movement rails are moved backward to the original position, and the above operation is repeated, so that items of goods are intermittently transferred along the fixed rails.

In the conventional horizontal goods transfer apparatus having the above arrangement, however, since the flexible tube must move not only the vertical movement rails but also the back-and-forth movement rails together with the goods, the flexible tube must have a structure and a material capable of enduring a considerably large weight.

If a reciprocally driving means for driving the back-and-forth movement rails is also mounted on the vertical movement rails, the load that must be moved upward/downward by the flexible tube further increases. Members and structures capable of upholding higher pressures are required, leading to an economical disadvantage.

BRIEF SUMMARY OF THE INVENTION

The present invention has been made in view of the above situations, and has as its object to provide a horizontal goods transfer apparatus in which the load that must be moved upward/downward by a flexible tube is decreased as well as the number of components to simplify the arrangement, thus providing an economical advantage.

According to one aspect of the present invention, there is provided a horizontal goods transfer apparatus comprising:

a horizontal fixed rail extending in a back-and-forth direction and capable of mounting thereon a plurality of goods items in a row in a longitudinal direction thereof;

a back-and-forth movement rail arranged to be substantially parallel to the fixed rail and placed to be reciprocally movable in the back-and-forth direction;

reciprocally driving means for reciprocally moving the back-and-forth movement rail in the back-and-forth direction for a predetermined distance;

a vertical movement rail supported by the back-and-forth movement rail to be vertically movable and capable of being located at an upper position higher than the fixed rail and a lower position lower than the fixed rail;

a flexible tube placed on the back-and-forth movement rail and under the vertical movement rail to extend along the vertical movement rail and inflated/deflated upon supply/discharge of compressed air, thereby vertically moving the vertical movement rail to the upper and lower positions;

compressed air supplying/discharging means for supplying/discharging the compressed air to/from the flexible tube; and control means for controlling the compressed air supplying/discharging means and the reciprocally driving means to combine a vertical movement of the vertical movement rail and a reciprocal movement of the back-and-forth movement rail, thereby intermittently transferring the goods items in the back-and-forth direction.

With the above arrangement, the flexible tube is mounted on the back-and-forth movement rail to vertically move the vertical movement rail. Since the back-and-forth movement rail need not be lifted, the load that must be moved vertically by the flexible tube can be decreased. As a result, specific members or structures that withstand high-pressures are not required, leading to a simple arrangement which is economically advantageous.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 8 is a sectional view of the lane shown in FIG. 3 taken along the line VIII—VIII thereof;

FIG. 9 is a sectional view of the lane shown in FIG. 3 taken along the line IX—IX thereof;

FIG. 10 is a sectional view of the lane shown in FIG. 3 taken along the line X—X thereof;

FIG. 14 is a block diagram showing a pneumatic circuit for supplying/discharging compressed air in the horizontal flow-through rack and a control system for it;

DETAILED DESCRIPTION OF THE INVENTION

Figure 1:
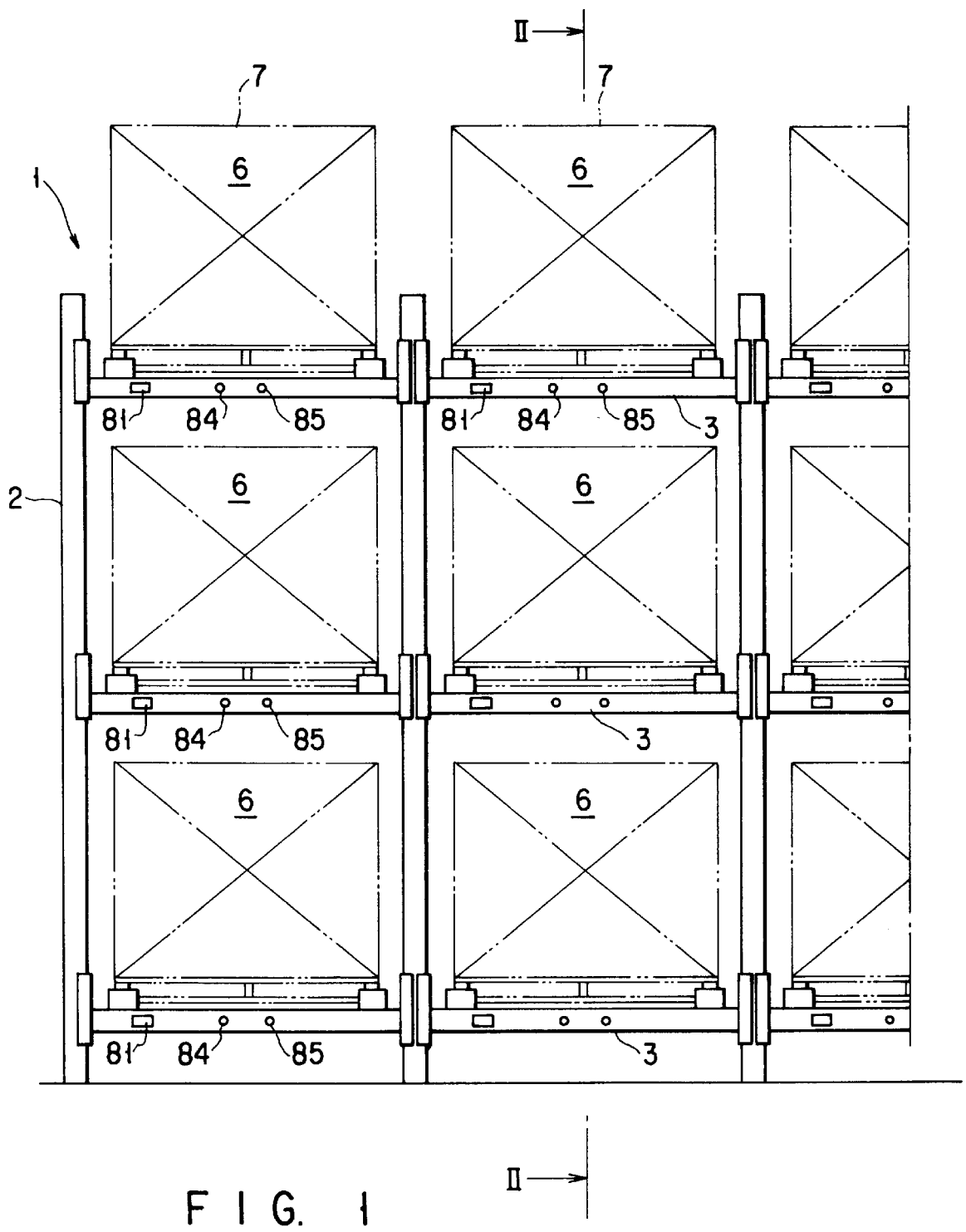
FIG. 1 is a front view of a horizontal goods transfer apparatus according to the first embodiment of the present invention, in which one bay surface of the horizontal flow-through rack is partly omitted.
Figure 2:
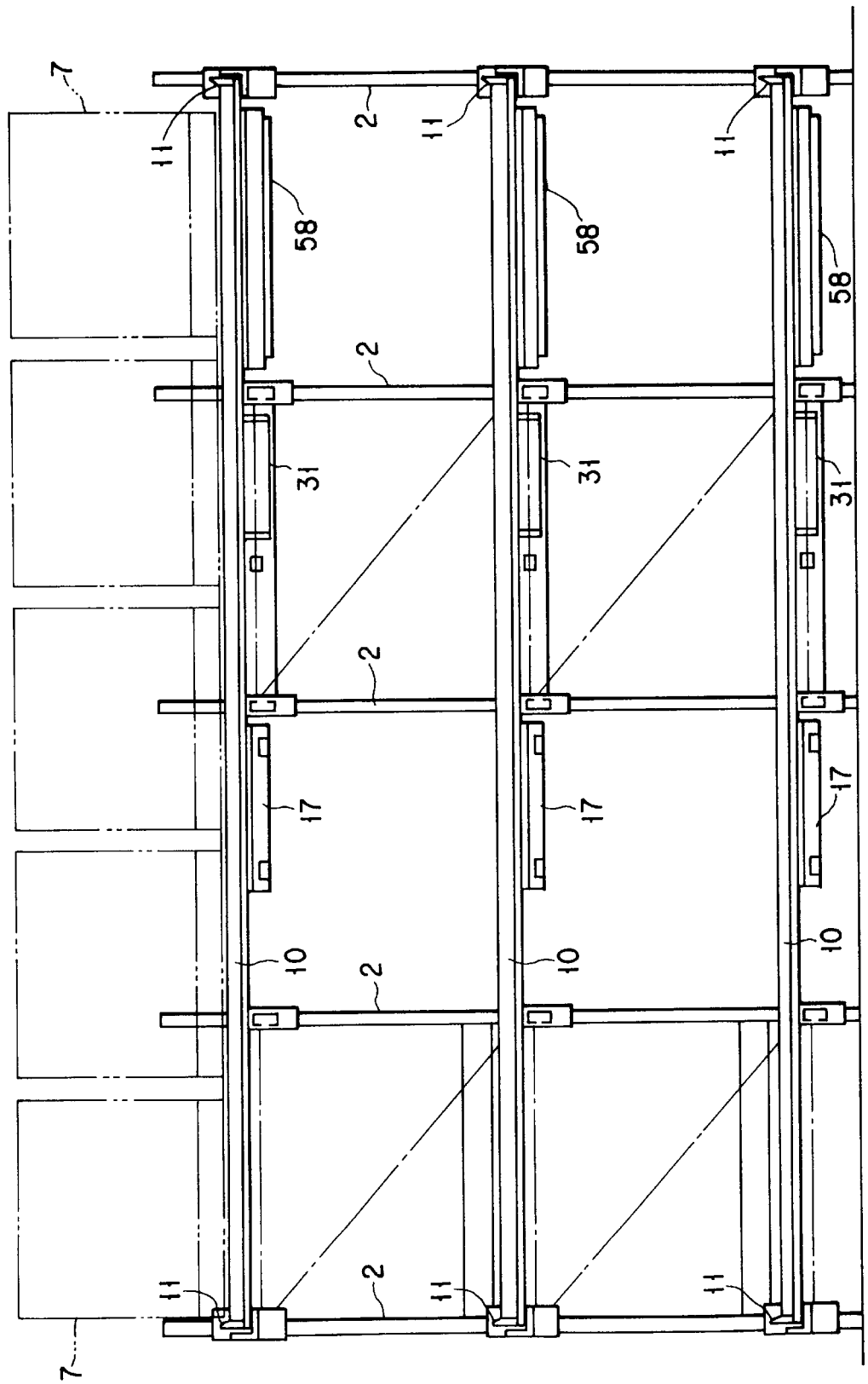
FIG. 2 is a side view for explaining the overall structure of the horizontal flow-through rack of the first embodiment.

The first embodiment of the present invention will be described in detail with reference to the accompanying drawings. FIG. 1 is a front view showing one bay surface of a horizontal flow-through rack 1, which is to be described in this embodiment, by partly omitting it. FIG. 2 is a side view of the horizontal flow-through rack 1. The horizontal flow-through rack 1 has a large number of struts 2 vertically extending to form rows in the back-and-forth direction and the right-to-left direction.

Of the large number of struts 2, those arranged in the right-to-left direction are coupled to each other with lateral stringer members 3. The lateral stringer members 3 are coupled to each other with fixed rails 10 horizontally extending from the front end to the rear end of the horizontal flow-through rack 1.

Therefore, as shown in FIG. 1, a plurality of bays partitioned by the struts 2 and the lateral stringer members 3 into a matrix are formed on the front surface of the horizontal flow-through rack 1. Each bay extends long in the back-and-forth direction along the fixed rails 10 to form a row. Each row serves as a lane 6 for loading thereon goods item 7 mounted on a pallet and transferring the goods item 7.

Figure 3:
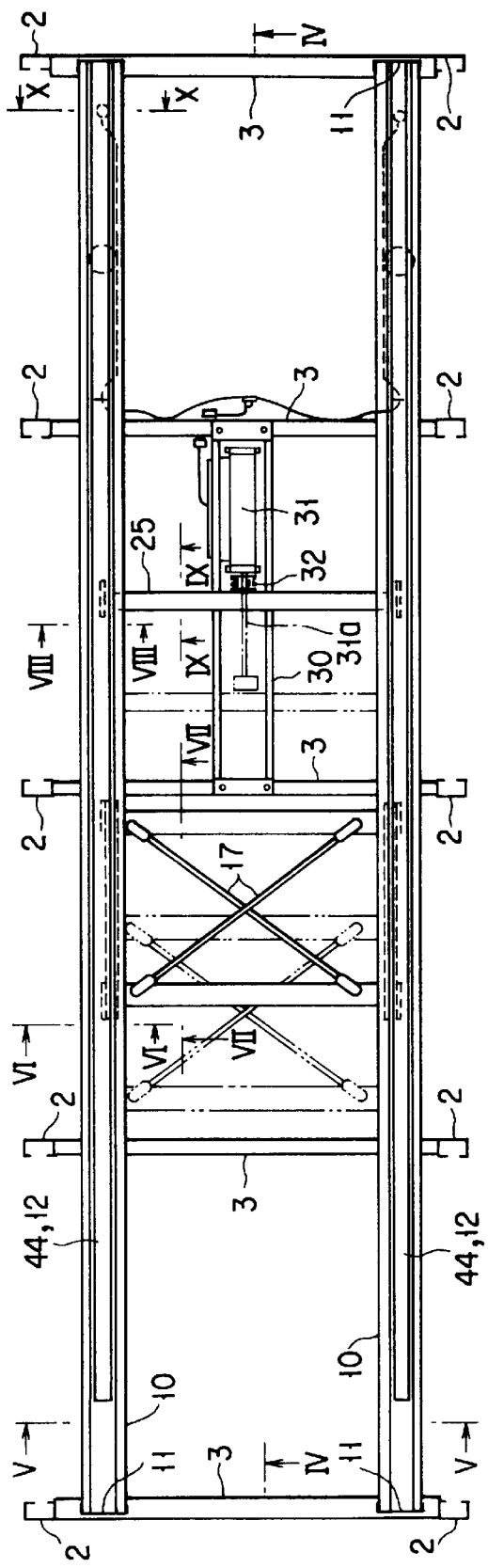
FIG. 3 is a plan view for explaining the overall structure of one lane of the horizontal flow-through rack.
Figure 4:
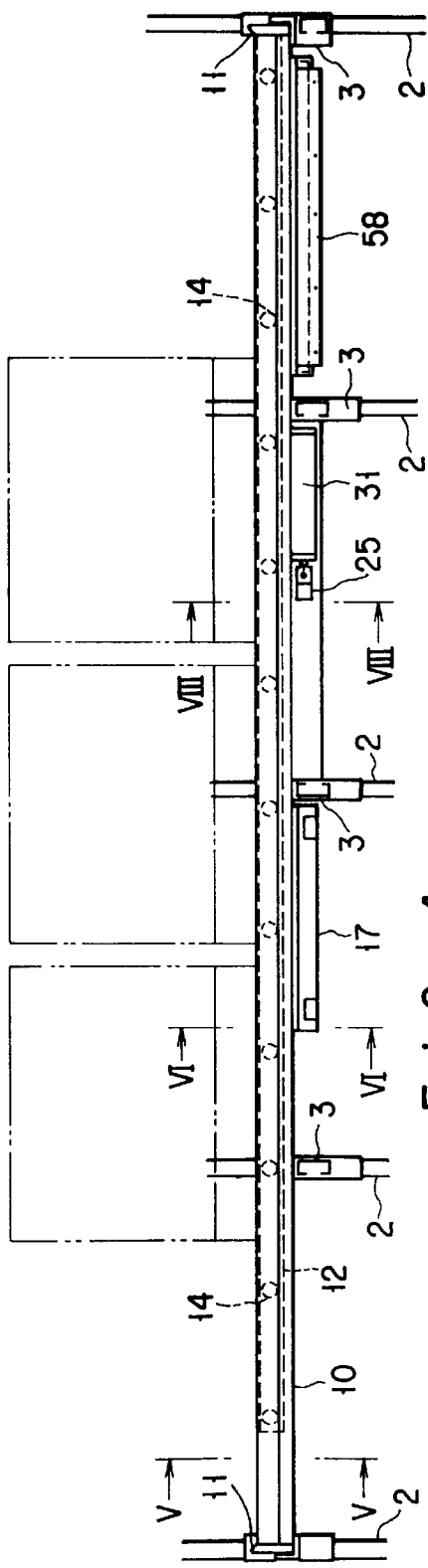
FIG. 4 is a side view for explaining the overall structure of one lane of the horizontal flow-through rack.
Figure 5:
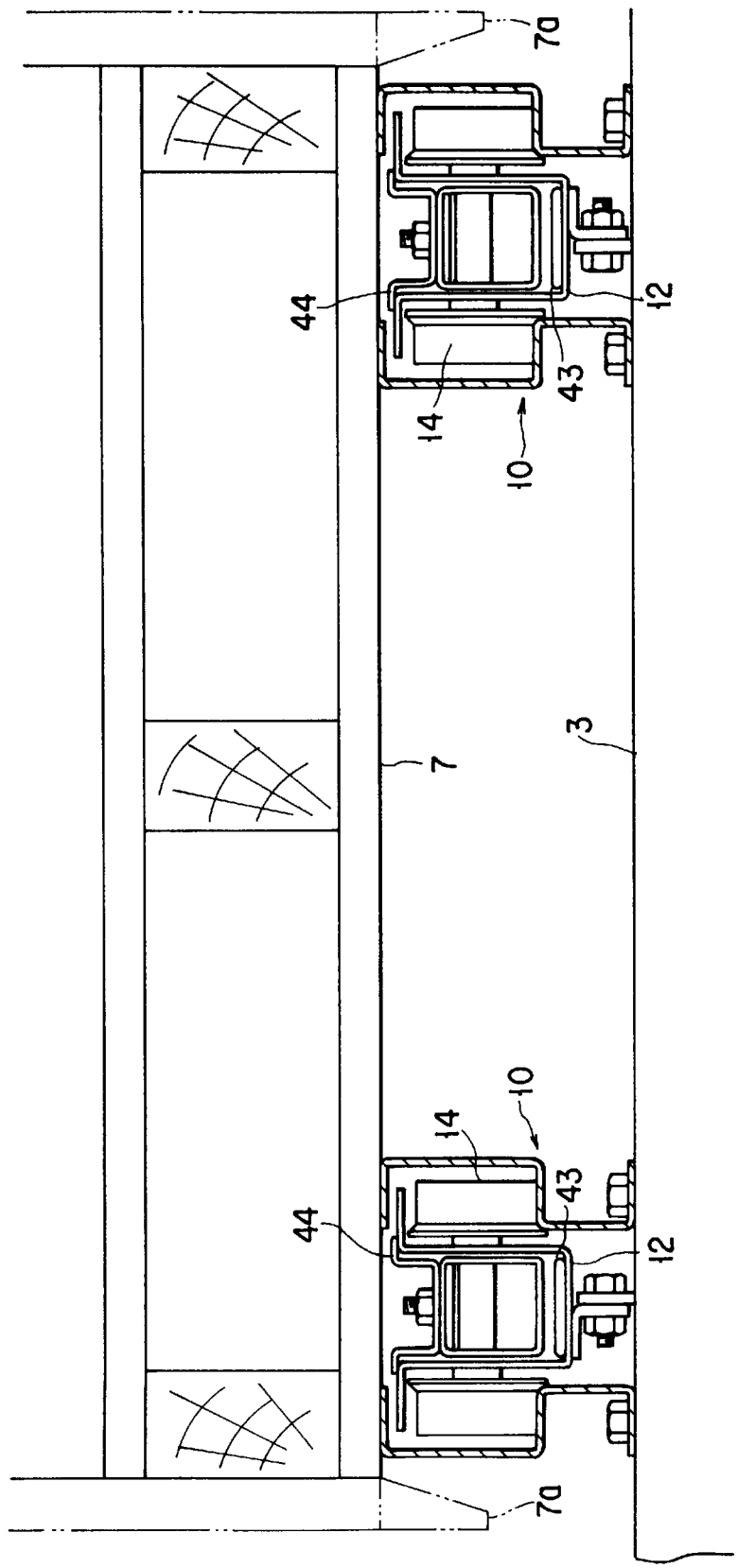
FIG. 5 is a sectional view of the lane shown in FIGS. 3 and 4 taken along the line V—V thereof.
Figure 6:
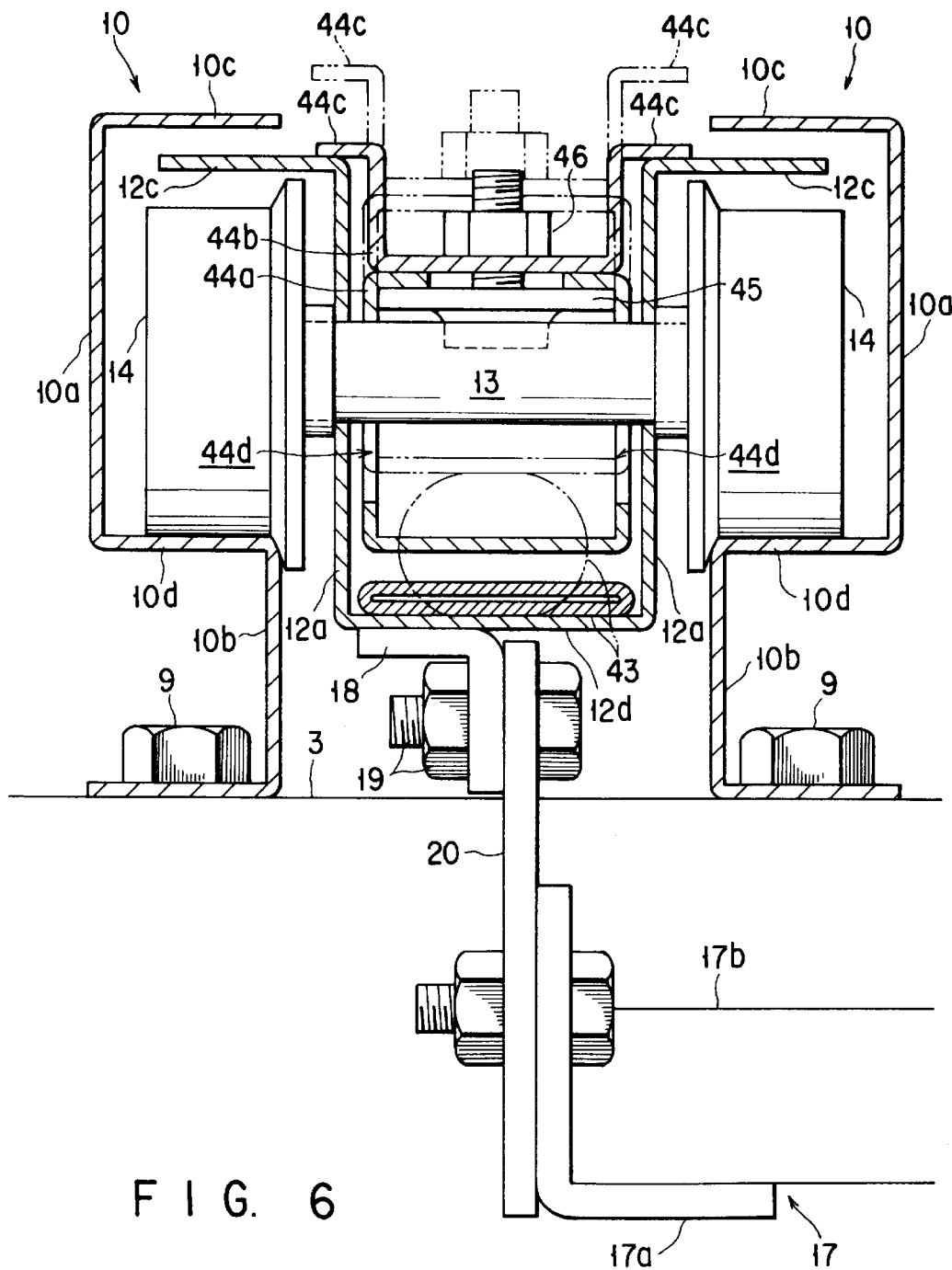
FIG. 6 is a sectional view of the lane shown in FIGS. 3 and 4 taken along the line VI—VI thereof.

FIG. 3 is a plan view showing one lane 6. FIG. 4 is a side view of the lane 6. FIG. 5 is a sectional view of the lane 6 shown in FIGS. 3 and 4 taken along the line V—V thereof. FIG. 6 is a sectional view of the lane 6 taken along the line VI—VI of FIG. 3 to show the rail portion in enlargement.

In each lane 6, a pair of right and left fixed rails 10 extend on the plurality of lateral stringer members 3 arranged in the back-and-forth direction to be directed in the back-and-forth direction and parallel to each other throughout the entire length of the flow-through rack. Each fixed rail 10 has a pair of symmetric, right and left rail members 10, as shown in FIG. 6.

These rail members 10 are installed such that the openings of their channel-like portions 10a oppose each other. In this case, the respective rail members 10 are fixed by threadably attaching their leg portions 10b on the corresponding lateral stringer member 3 with bolts 9. Stoppers 11 vertically extend upward from the front and rear end portions of each fixed rail 10.

A channel-like back-and-forth movement rail 12 which opens upward is arranged between the pair of right and left rail members 10 constituting the fixed rail 10 to be directed in the back-and-forth direction. An axle 13 rotatably extends through two side walls 12a of the back-and-forth movement rail 12. A plurality of axles 13 are arranged in the longitudinal direction of the back-and-forth movement rail 12.

Running wheels 14 are fitted on the two end portions of each axle 13. The running wheels 14 fitted on the two end portions of the axle 13 are fitted in the openings of the opposing channel-like portions 10a of the rail members 10 and roll placed on horizontal lower walls 10d of the channel-like portions 10a.

The length of the back-and-forth movement rail 12 is set to be smaller than the fixed rail 10 by an amount corresponding to the driving stroke of an air cylinder 31 (to be described later), as shown in FIGS. 3 and 4. Hence, the back-and-forth movement rail 12 is supported to be reciprocally movable with respect to the fixed rail 10 in the back-and-forth direction by an amount corresponding to the stroke of the air cylinder 31.

The upper end portions of the two side walls 12a of the back-and-forth movement rail 12 are respectively bent outward to form horizontal flanges 12c. The flanges 12c are loosely fitted between the upper walls 10c of the channel-like portions 10a of the rail members 10 and the running wheels 14.

A flexible tube 43 having a length corresponding to the entire length of the back-and-forth movement rail 12 is set on a bottom wall 12d of the channel-like back-and-forth movement rail 12. Between the two side walls 12a of the back-and-forth movement rail 12, a vertical movement rail 44 is supported above the flexible tube 43 to be movable upward/downward with respect to the back-and-forth movement rail 12.

The vertical movement rail 44 is constituted by a channel-like lower member 44a and a channel-like upper member 44b which opens upward. Flange bolts 45 and nuts 46 fix the lower and upper members 44a and 44b at a plurality of portions, thereby integrally coupling them.

The lower and upper members 44a and 44b are loosely inserted in the back-and-forth movement rail 12 to have a small gap with respect to the side walls 12a. Furthermore, vertically elongated holes 44d for clearing the axles 13 are formed in the two side walls of the lower member 44a.

The upper end portions of the right and left side walls of the upper member 44b of the vertical movement rail 44 are bent outward to form horizontal goods rest plates 44c. The goods rest plates 44c are movable to come into contact with the upper portions of flanges 12c of the back-and-forth movement rail 12. The position where the goods rest plates 44c come into contact with the flanges 12c is the lowest position of the downward movement of the vertical movement rail 44.

The goods rest plates 44c are located between upper walls 10c of the pair of rail members 10 and can move upward to above the upper walls 10c without coming into contact with them.

Therefore, as shown in FIG. 6, while the flexible tube 43 is deflated, the vertical movement rail 44 is at the lower position, and its goods rest plates 44c are supported on the flanges 12c of the back-and-forth movement rail 12. At this time, the goods rest plates 44c are located below the upper walls 10c of the fixed rail 10.

When compressed air is supplied into the flexible tube 43 to inflate it, the vertical movement rail 44 is lifted upward, as indicated by an alternate long and two short dashes line in FIG. 6. At this time, the vertical movement rail 44 is guided to move vertically upward since the axles 13 are loosely inserted in its elongated holes 44d.

The vertical movement rail 44 is moved upward until its goods rest plates 44c project upward above the upper walls 10c of the fixed rail 10. The upward movement of the vertical movement rail 44 continues until the lower end portions of its elongated holes 44d abut against the axles 13.

Assume that the goods item 7 is placed on the upper walls 10c of the fixed rail 10 upon deflation of the flexible tube 43. When the flexible tube 43 is inflated to move the vertical movement rail 44 upward, the goods rest plates 44c of the vertical movement rail 44 abut against the bottom surface of the goods item 7 to lift it upward. In other words, the goods item 7 is transferred from the fixed rail 10 to the vertical movement rail 44.

As shown in FIGS. 3 and 4, the right and left back-and-forth movement rails 12 are coupled to each other with a horizontal brace frame 17 such that they slightly deviate to one side from their central portions in the longitudinal direction. Depending on the length of the lane 6, the right and left back-and-forth movement rails 12 can be coupled to each other with a plurality of horizontal brace frames 17.

Figure 7:
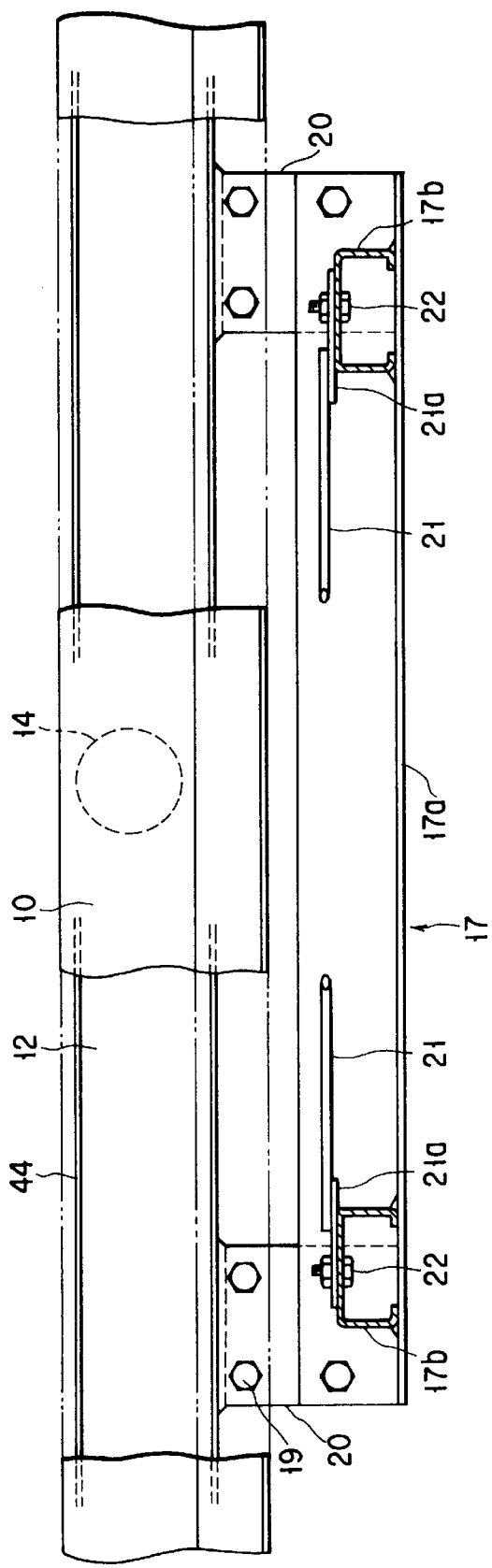
FIG. 7 is a sectional view of the lane shown in FIG. 3 taken along the line VII—VII thereof.

More specifically, as shown in FIGS. 6 and 7, one end portion of an attaching plate 18 is fixed to the bottom wall 12d of the back-and-forth movement rail 12. One end portion of a gusset plate 20 is integrally fixed to the other end portion of the attaching plate 18 through bolt-nut units 19. The other end portion of the gusset plate 20 extends downward between the two rail members 10.

This gusset plate 20 is set at each of the two front and rear portions of each of the right and left back-and-forth movement rails 12. The rectangular horizontal brace frame 17 is set between the total of four gusset plates 20 to integrally couple the right and left back-and-forth movement rails 12.

The horizontal brace frame 17 has a support plate 17a having an L-shaped section to couple the front and rear gusset plates 20, and a pair of front and rear channel-like connecting rods 17b for coupling the right and left support plates 17a. Horizontal braces 21 are respectively set on the diagonal connecting rods 17b and their end portions are fixed with bolt-nut units 22. In this case, the two horizontal braces 21 are set to cross each other to improve the rigidity.

As shown in FIGS. 8 and 9, the right and left back-and-forth movement rails 12 are coupled to each other with a push-pull rod 25 independently of the horizontal brace frame 17. More specifically, one end portion of an attaching plate 26 is fixed to the bottom wall 12d of the back-and-forth movement rail 12. The other end portion of the attaching plate 26 is integrally fixed to one end portion of a gusset plate 29 with bolt-nut units 28.

The other end portion of the gusset plate 29 extends downward between the two rail members 10. This gusset plate 29 is provided to each of the right and left back-and-forth movement rails 12. The quadrangular prismatic push-pull rod 25 extends between the two gusset plates 29.

As shown in FIG. 3 again, at the central portion between the right and left back-and-forth movement rails 12, a cylinder support member 30 extends between the front and rear lateral stringer members 3 arranged in the back-and-forth direction such that it is directed in the back-and-forth direction. The double acting air cylinder 31 is attached to the cylinder support member 30 to be parallel to the back-and-forth movement rails 12.

The distal end portion of a piston rod 31a of the air cylinder 31 is coupled to the central portion of the push-pull rod 25 through a coupling member 32. When the piston rod 31a of the air cylinder 31 extends or retracts by an amount corresponding to its stroke, the back-and-forth movement rails 12 move back and forth through the push-pull rod 25.

The stroke of the piston rod 31a may be set to a length obtained by dividing the length as the sum of the back-and-forth length of the goods item 7 and the gap among the goods item 7 by an integer, e.g., 4 or 5. Depending on the length of the back-and-forth movement rails 12, a plurality of air cylinders 31 may be installed.

Figure 11:
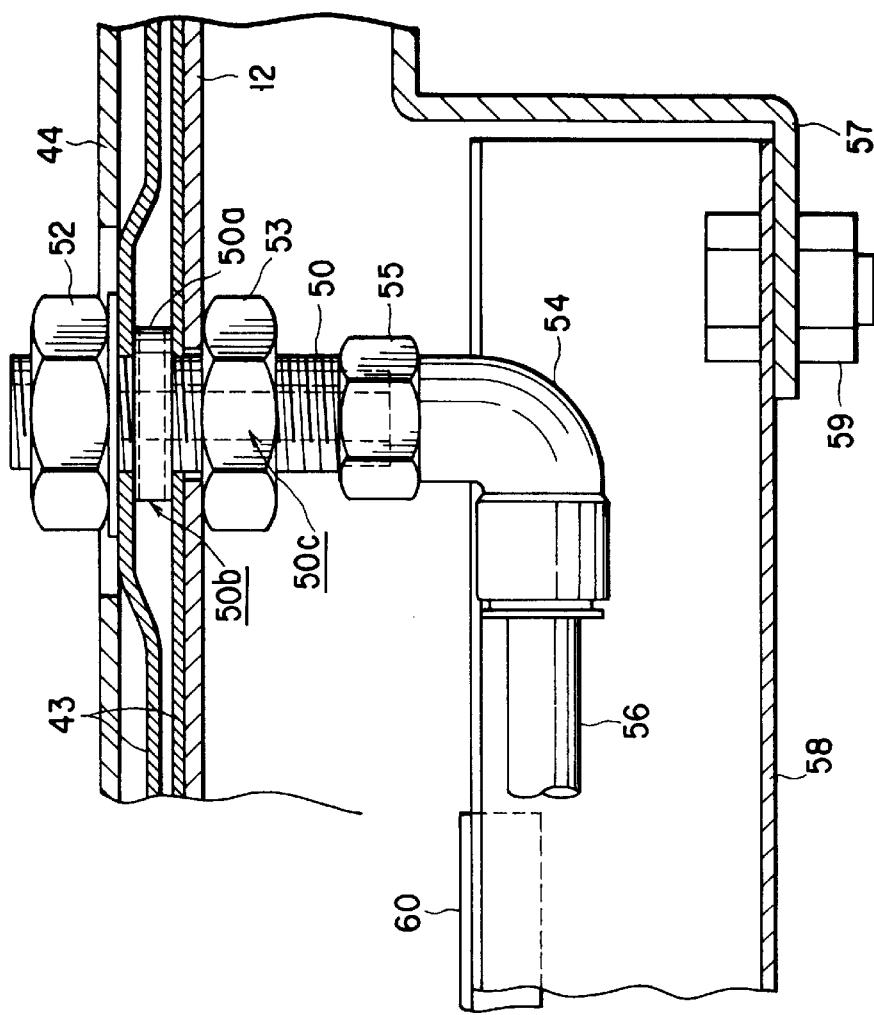
FIG. 11 is a sectional view of a structure shown in FIG. 10 for supplying/discharging compressed air, which is taken along the line XI—XI thereof.

FIGS. 10 and 11 show the structure of a means for supplying/discharging compressed air to/from the flexible tube 43. More specifically, FIG. 10 is a sectional view of the lane 6 taken along the line X—X of FIG. 3, and FIG. 11 is a sectional view of the lane 6 taken along the line XI—XI of FIG. 10.

The front and rear end portions of the flexible tube 43 which is elongated in the back-and-forth direction are flatly sealed to be closed. Supply and discharge of the compressed air are performed near one end portion of the flexible tube 43.

More specifically, an air supply/discharge bolt 50 formed with a predetermined-thickness disk-like flange 50a midway therealong and having ventilation channels 50b and 50c therein extends through the flexible tube 43 to place its flange 50a in the flexible tube 43. A nut 52 is screwed, through a washer 51, on the bolt portion of the air supply/discharge bolt 50 projecting above the flexible tube 43. Of the lower member 44a of the vertical movement rail 44, a portion corresponding to the upper portion of the air supply/discharge bolt 50 is omitted.

A bolt portion of the air supply/discharge bolt 50 projecting downward below the flexible tube 43 extends through the bottom wall 12d of the back-and-forth movement rail 12, and a nut 53 is screwed on this bolt portion. Therefore, when the upper and lower nuts 52 and 53 are tightened, the upper portion of the flexible tube 43 is sandwiched by the flange 50a and the washer 51. The lower portion of the flexible tube 43 is sandwiched by the flange 50a and the bottom wall 12d of the back-and-forth movement rail 12. In other words, the portions of the flexible tube 43 above and below a portion where the air supply/discharge bolt 50 extends are maintained airtight.

The ventilation channel 50b is formed in the disk-like flange 50a of the air supply/discharge bolt 50 to extend through it in the direction of diameter. The ventilation channel 50c is formed in the air supply/discharge bolt 50 to communicate with the ventilation channel 50b formed in the flange 50a and to extend downward through the center of the air supply/discharge bolt 50. An elbow pipe 54 is coupled to the lower bolt portion of the air supply/discharge bolt 50 with a nut 55. This elbow pipe 54 is connected to a resin-made flexible air tube 56.

The means for supplying/discharging compressed air to/from the flexible tube 43 has the structure as described above. Therefore, the compressed air supplied through the air tube 56 enters the flexible tube 43 through the ventilation channels 50c and 50b in the air supply/discharge bolt 50 to inflate the flexible tube 43. As a result, the vertical movement rail 44 is moved upward. When the compressed air is discharged from the flexible tube 43, the flexible tube 43 is deflated to move the vertical movement rail 44 downward.

The flexible tube 43 reciprocally moves back and forth together with the back-and-forth movement rail 12. Hence, the air supply/discharge bolt 50 also moves back and forth, together with the back-and-forth movement rail 12, as it projects downward between the right and left rail members 10 constituting the fixed rail 10.

Angle-shaped platform members 57 respectively fixed to the front and rear lateral stringer members 3 are set below the right and left back-and-forth movement rails 12 at portions where the air supply/discharge bolt 50 moves back and forth. A tube accepting box 58 which is elongated in the back-and-forth direction is fixed between the platform members 57 with bolt-nut units 59.

The front and rear portions, and the upper portion of the tube accepting box 58 are open. The lower half portion of the flexible tube 43 coupled to the lower portion of the air supply/discharge bolt 50 is loosely inserted in the tube accepting box 58 through the upper opening of the tube accepting box 58. The upper opening of the tube accepting box 58 is covered with a cover 60 excluding its portion which is moved forward and backward the elbow pipe 54.

A tube fixing tool 61 is attached to one of the front and rear platform members 57 to extend through it. One end portion of the air tube 56 extending from the elbow pipe 54 is coupled to the tube fixing tool 61. The tube fixing tool 61 couples one end portion of an air tube disposed outside the tube accepting box 58 to cause the internal and external air tubes to communicate with each other.

Figure 12:
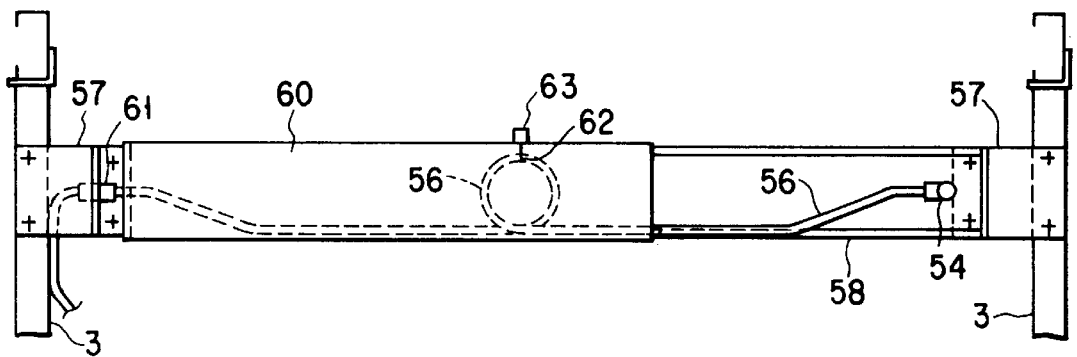
FIGS. 12 and 13 are plan views, respectively, for explaining how to place an air tube in the horizontal flow-through rack.
Figure 13:
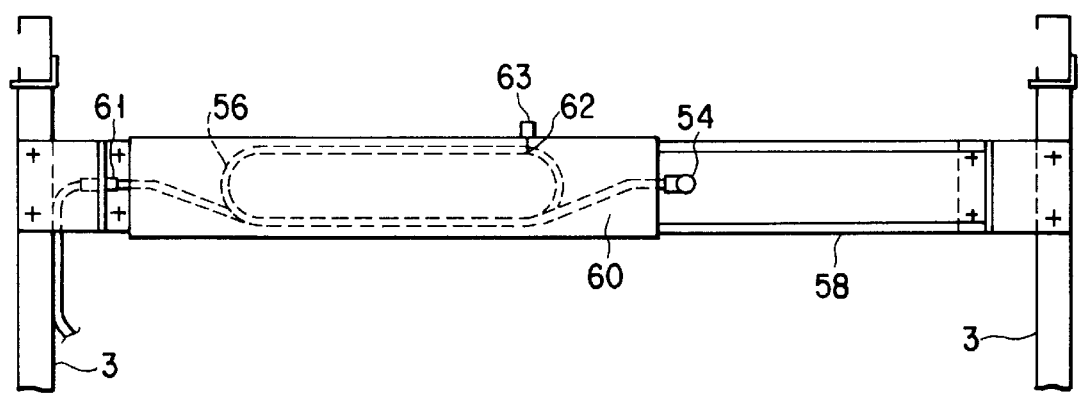

As shown in FIGS. 12 and 13, the air tube 56 is accommodated in the tube accepting box 58 such that it coils once to form a loop between the elbow pipe 54 and the tube fixing tool 61. FIG. 12 shows the state of the air tube 56 when the elbow pipe 54 is farthest from the tube fixing tool 61.

At this time, the air tube 56 forms a small circular loop. A string 62 extending through the side wall of the tube accepting box 58 is partly wound on the loop of the air tube 56, thereby fixing the air tube 56 in the tube accepting box 58. The two end portions of the string 62 wound on the air tube 56 which are extending from the side wall of the tube accepting box 58 to the outside are tied with a tying tool 63.

Assume that from the state shown in FIG. 12, the back-and-forth movement rail 12 moves by an amount corresponding to one stroke of the air cylinder 31, and the elbow pipe 54 moves closest to the tube fixing tool 61, as shown in FIG. 13. Then, a portion of the air tube 56 between its portion fixed with the string 62 and the elbow pipe 54 forms a large elliptic loop in a region in the tube accepting box 58 covered with the cover 60.

In this manner, even when the elbow pipe 54 moves back and forth, the air tube 56 repeats the predetermined movement of changing the size of its loop in the tube accepting box 58. As a result, the air tube 56 is prevented from being bent inadvertently or entangled.

In the above embodiment, since the distance between the elbow pipe 54 and the tube fixing tool 61 is set long as compared to one stroke of the air cylinder 31, a loop is formed midway along the air tube 56. If the distance between the elbow pipe 54 and the tube fixing tool 61 is small, the air tube 56 may be arranged to form a letter U which is elongated in the back-and-forth direction in the tube accepting box 58.

In this manner, the flexible tube 43 which moves together with the back-and-forth movement rail 12 and the compressed air supplying side as the fixed side are caused to communicate with each other by allowing the air tube 56 to perform a predetermined movement.

FIG. 14 shows a pneumatic circuit 70 for supplying/discharging compressed air to/from the flexible tube 43, and its control system. A pipe extending from a pneumatic source 71 passes through a filter 72 and branches into two directions. The branch pipes are connected to the input ports of solenoid valves 75 and 76 through reducing valves 73 and 74, respectively.

Of the two solenoid valves, the back-and-forth movement solenoid valve 75 connected to the reducing valve 73 is a 5-port, 2-position solenoid valve. The two output ports of the back-and-forth movement solenoid valve 75 are respectively connected to the pull-side input/output port and the push-side input/output port of the air cylinder 31 through flow control valves 77 and 78 having check valves.

Therefore, when the back-and-forth movement solenoid valve 75 is OFF, it operates to pull the piston rod 31a; when it is ON, it operates to push the piston rod 31a. More specifically, when the back-and-forth movement solenoid valve 75 alternately repeats the ON and OFF states at predetermined timings, the air cylinder 31 extends and retracts its piston rod 31a to reciprocally move the back-and-forth movement rail 12.

The vertical movement solenoid valve 76 connected to the reducing valve 74 is a 3-port, 2-position solenoid valve. The output port of the vertical movement solenoid valve 76 is coupled to the right and left flexible tubes 43 through a branch pipe. When the vertical movement solenoid valve 76 is OFF, the interior of the flexible tube 43 communicates with the atmosphere to discharge air, and the vertical movement rail 44 is at the lower position. When the vertical movement solenoid valve 76 is OFF, compressed air is supplied to the flexible tube 43 to inflate it, and the vertical movement rail 44 is at the upper position.

The back and forth movement solenoid valve 75 and the vertical movement solenoid valve 76 are controlled by a control computer 80. The control computer 80 receives an operation signal from a mode selection switch 81 and detection signals from a deepest side goods detector 82 and a loading/unloading side goods detector 83 to perform ON/OFF control of the back and forth movement solenoid valve 75 and the vertical movement solenoid valve 76, and to turn on/off an unloading mode indicator lamp 84 and a loading mode indicator lamp 85.

In the above embodiment, the horizontal flow-through rack 1 is used as a first-in, last-out flow-through rack. In other words, one bay side is used as the loading/unloading port to perform loading/unloading. On the bay surface serving as the loading/unloading side, as shown in FIG. 1, the unloading mode indicator lamp 84 and the loading mode indicator lamp 85 that emit light of different colors are arranged side by side, and the mode selection switch 81 is disposed.

The deepest side goods detector 82 is a sensor for detecting whether or not a goods item 7 is present in the deepest side opposite to the loading/unloading port of the lane 6. The loading/unloading side goods detector 83 is a sensor for detecting whether or not a goods item 7 is present in the loading/unloading port. As these sensors, e.g., light sensors, limit switches, and the like are used.

The control sequence in the loading mode will be described. In the initial state, the loading mode indicator lamp 85 is turned on to indicate that a goods item 7 is present in the loading/unloading port. The vertical movement rails 44 are at the lower position. The back-and-forth movement rails 12 are at the backward position, i.e., at the loading/unloading port side.

In this state, when a goods item 7 is loaded from the loading/unloading port, it is placed on the upper walls 10c of the right and left fixed rails 10. When the loading/unloading side goods detector 83 detects the presence of the goods item 7, the control computer 80 turns on the vertical movement solenoid valve 76 and inflates the right and left flexible tubes 43 to move the vertical movement rails 44 upward. Thus, the goods rest plates 44c abut against the bottom surface of the goods item 7 to push it up, thereby lifting it up to float from the upper walls 10c of the fixed rails 10.

Thereafter, the control computer 80 controls the air cylinder 31 through the back-and-forth movement solenoid valve 75 to move the back-and-forth movement rails 12 forward. The back-and-forth movement rails 12 move forward by an amount corresponding to one stroke of the air cylinder 31. Accordingly, the vertical movement rails 44 also move forward, thereby moving the goods item 7 placed on the vertical movement rails 44 forward.

Subsequently, the control computer 80 controls the vertical movement solenoid valve 76 in the OFF state and extracts compressed air from the right and left flexible tubes 43 to move the vertical movement rails 44 downward. Then, the goods item 7, which has been moved forward by the amount corresponding to one stroke of the air cylinder 31, is transferred from the goods rest plates 44c of the vertical movement rails 44 to the upper walls 10c of the fixed rails 10.

Thereafter, the control computer 80 controls the air cylinder 31 through the back-and-forth movement solenoid valve 75 in order to move the back-and-forth movement rails 12 backward. Then, the back-and-forth movement back-and-forth movement rails 12 move backward by an amount corresponding to one stroke of the air cylinder 31. Accordingly, the vertical movement rails 44 also move backward. Hence, the back-and-forth movement rails 12 and the vertical movement rails 44 are restored to the initial state described above.

Even if a goods item 7 has already been loaded in the lane 6, it is lifted together with the currently loaded goods item 7 by the vertical movement rails 44 so that they move simultaneously by the amount corresponding to one stroke of the air cylinder 31.

When the above procedure is repeated, the goods items 7 in the lane 6 move forward at once by one stroke. When the above procedure is repeated four or five times, an empty space where another goods item 7 can be loaded is formed in the loading/unloading port.

When a plurality of goods items 7 are sequentially loaded in this manner, the loaded goods items 7 move as they are maintained at a predetermined gap. Assume that goods item 7 which has been loaded first reaches the deepest end of the lane 6, that the deepest side goods detector 82 detects the presence of a goods item 7, that the lane 6 is full and the goods item 7 at the loading/unloading port is not transferred deep, and that the loading/unloading side goods detector 83 detects the presence of a goods item 7. Then, the control computer 80 automatically switches the loading mode to the unloading mode.

At this time, the loading mode indicator lamp 85 is turned off, and the unloading mode indicator lamp 84 is turned on. In this unloading mode, at the forward position of the back-and-forth movement rails 12, i.e., at the deep position, the vertical movement rails 44 are moved upward to lift the goods item 7 at this position, in the opposite manner to that in the loading mode. In this state, the back-and-forth movement rails 12 are moved backward, and the goods item 7 is moved backward, i.e., to the loading/unloading port side, by an amount corresponding to one stroke of the air cylinder 31.

Thereafter, the vertical movement rails 44 are moved downward to transfer the goods item 7 to the fixed rails 10, and the back-and-forth movement rails 12 are moved forward to the original position. When this procedure is repeated, goods items 7 can be intermittently moved toward the loading/unloading port. The goods items 7 that have reached the loading/unloading port are sequentially extracted.

When the goods items 7 are sequentially extracted in this manner until all the goods items 7 in the lane 6 are unloaded, both the deepest side goods detector 82 and the loading/unloading side goods detector 83 cease to detect the presence of goods items 7. Based on this state, the control computer 80 automatically switches the unloading mode to the loading mode.

The control computer 80 not only automatically performs switching between the loading and unloading modes in accordance with the presence/absence of goods items 7 in the lane 6, but can also forcibly switch the mode, even during operation in the loading or unloading mode, with an operation of the mode selection switch 81.

As described above, according to the horizontal flow-through rack 1 described in this embodiment, the back-and-forth movement rail 12 merely reciprocally moves back and forth with respect to the shelf frame and does not move vertically. Therefore, the extension/retraction of the piston rod 31a of the air cylinder 31 fixed to the shelf frame can be efficiently transmitted to the back-and-forth movement rail 12 with a simple structure without using a special link member or the like.

Since the flexible tube 43 need not lift the back-and-forth movement rail 12, the pneumatic pressure can be decreased accordingly. Hence, the flexible tube 43 does not need specific materials or structures that withstand high-pressures, which is economically advantageous.

Since the air cylinder 31 can utilize the pneumatic source 71 commonly with the flexible tube 43, the arrangement is simplified in this respect as well, which is economically advantageous.

Since the horizontal flow-through rack 1 is used as the first-in, last-out flow-through rack, the loading port and the unloading port can be set on the same bay side, thereby efficiently using the available space. Since no line pressure is applied at all, the rails can be prevented from being applied with a large compressive force or tensile force.

The horizontal flow-through rack 1 described above can also naturally be used as a first-in, first-out flow-through rack. The horizontal flow-through rack 1 can also transfer a so-called box-type pallet 7 having leg portions 7a at its right and left sides, as indicated by an alternate long and two short dashes line in FIG. 5.

Figure 15:
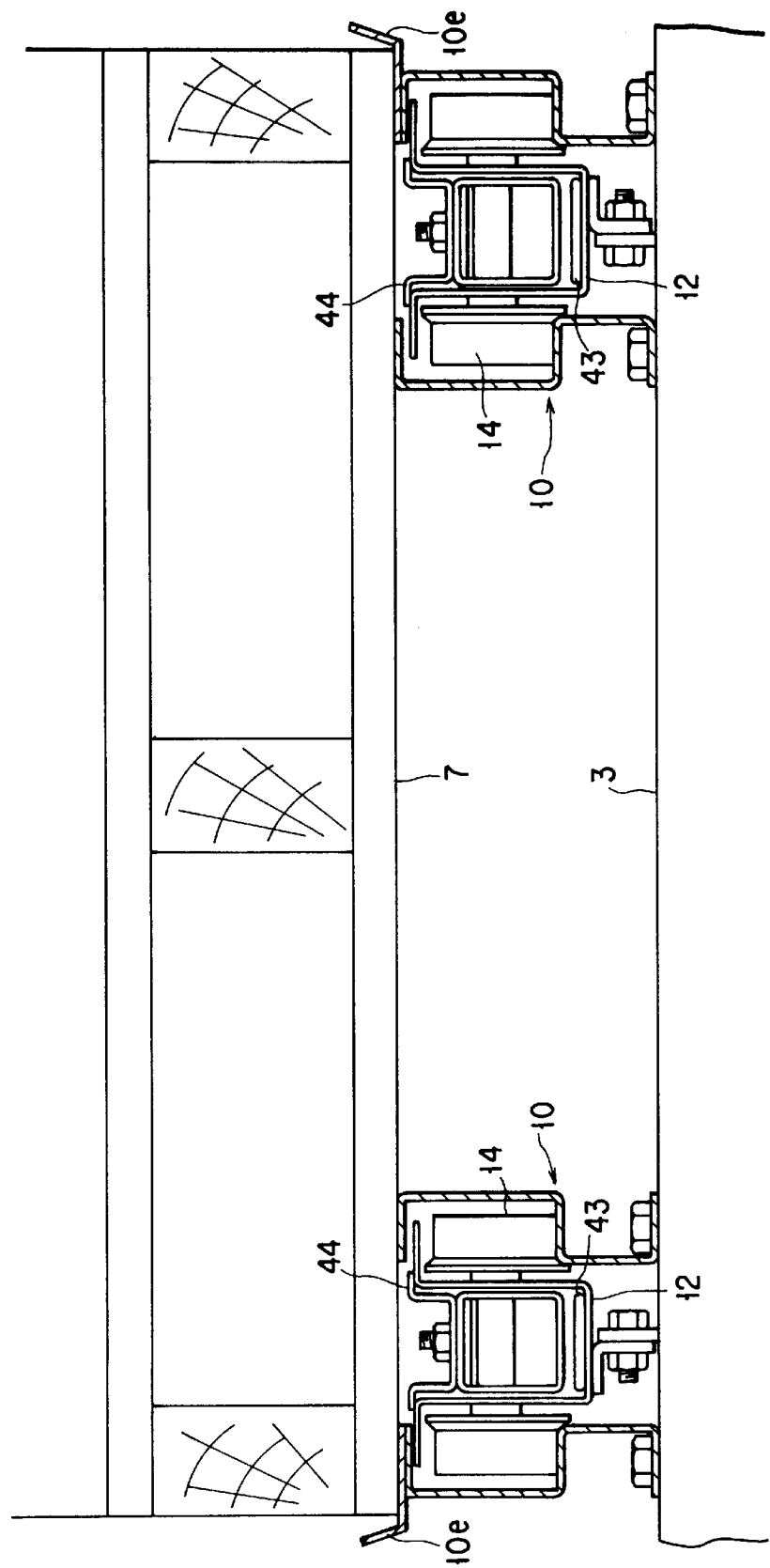
FIG. 15 is a sectional view showing an example in which side guides are added to the fixed rails of the horizontal flow-through rack.

When an ordinary pallet is to be transferred and the lane 6 is long, the outer sides of upper walls 10c of right and left fixed rails 10 can be respectively formed with side guides 10e for guiding the right and left sides of a pallet 7, as shown in FIG. 15.

The side guides 10e are formed on the outer sides of the upper walls 10c of the right and left fixed rails 10 to extend along the entire length of the upper walls 10c. The two side guides 10e rise with such an inclination that they open from the lower portion upward when seen from the front side.

Therefore, the pallet 7 is transferred as it slightly floats from the fixed rails 10. During the transfer, the pallet does not come into contact with the side guides 10e; during downward movement, it is centered by the inclination of the side guides 10e and placed on the fixed rails 10. For this reason, even if the lane 6 is long, the pallet 7 is prevented from derailing from the fixed rails 10.

Figure 16:
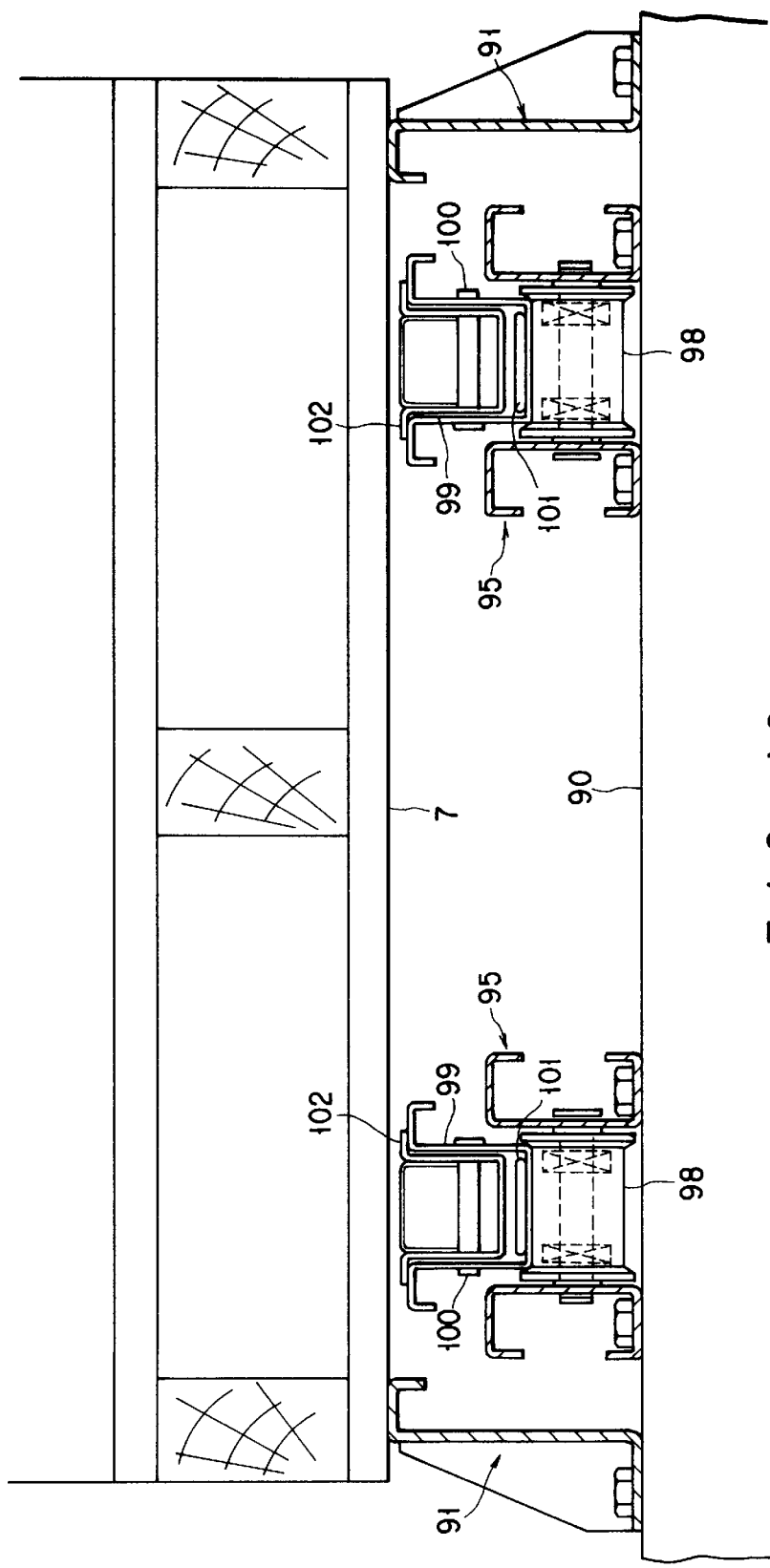
FIG. 16 is a sectional view for explaining a horizontal goods transfer apparatus according to the second embodiment of the present invention.
Figure 17:
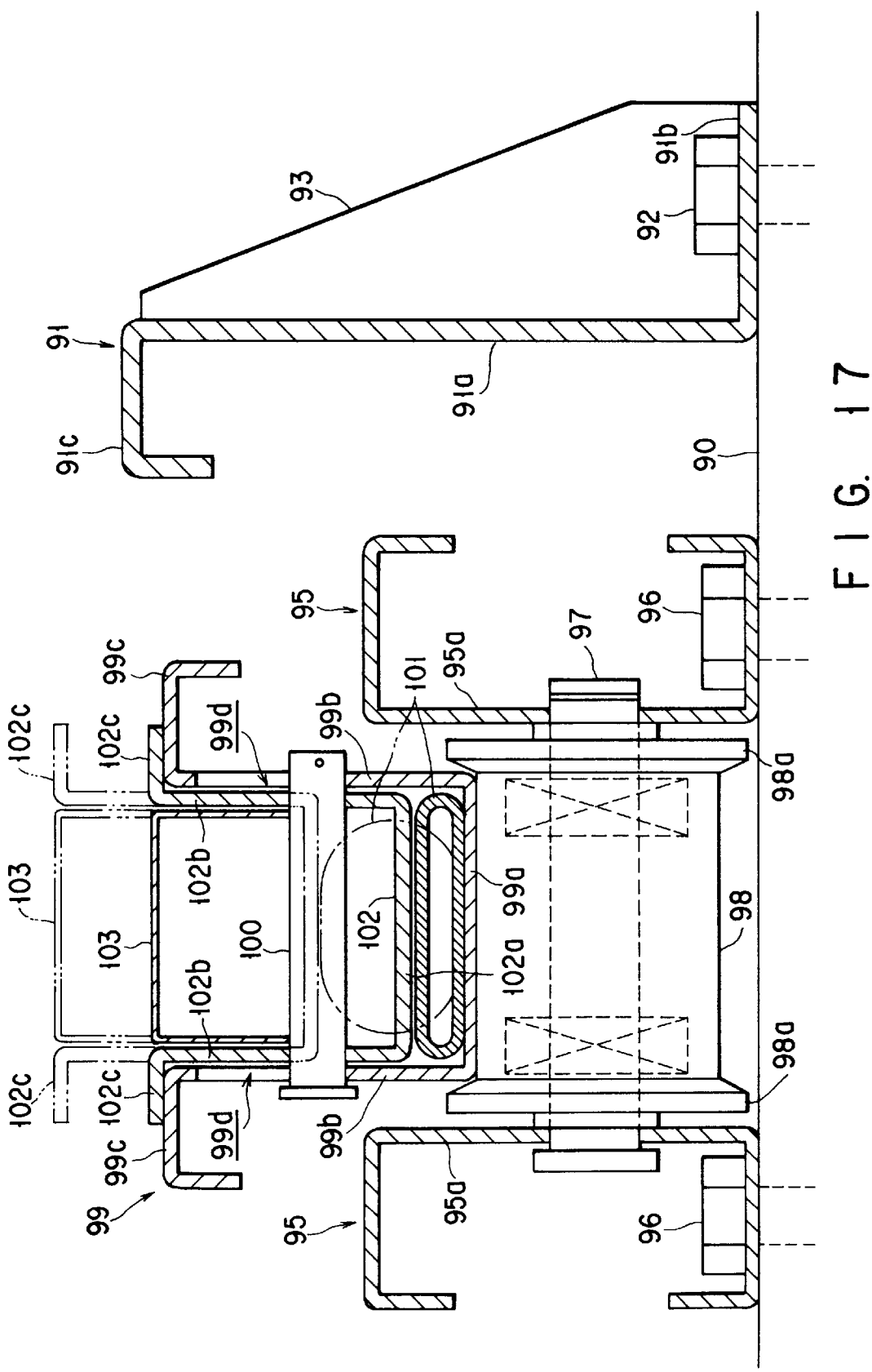
FIG. 17 is a sectional view for explaining the detailed structure of the main part of the second embodiment.

The second embodiment of the present invention will be described with reference to FIGS. 16 and 17. The second embodiment also shows the present invention applied to a horizontal flow-through rack 1. The frame structure of the flow-through rack itself is the same as that of the embodiment described above. FIG. 16 is a sectional view of one lane 6, and FIG. 17 is an enlarged sectional view of the main part of the lane 6.

More specifically, the respective rails are fixed by lateral stringer members 90 arranged in the back-and-forth direction. A pair of fixed rails 91 are disposed on the right and left outer sides. A pair of back-and-forth movement rails 99 and a pair of vertical movement rails 102 are integrally built and disposed inside the pair of fixed rails 91.

A lower wall 91b of each fixed rail 91, which is formed by outwardly bending the lower end portion of its side wall 91a, is fixed to the corresponding lateral stringer member 90 with a bolt 92. The upper end portion of the side wall 91a is bent inward to form an upper wall 91c. A goods item 7 is placed on the upper wall 91c. The distal end portion of the upper wall 91c is bent downward. Reinforcing plates 93 are welded to a plurality of portions in the back-and-forth direction of the outer surface of the side wall 91a of the fixed rail 91 at right angles to maintain the strength of the fixed rail 91.

Inside the pair of fixed rails 91, right and left pairs of elongated channel-like fixing support frames 95 are fixed to the lateral stringer member 90 with bolts 96. The right and left fixing support frames 95 of each pair respectively have side walls 95a separated from each other with a predetermined gap such that their channel openings face to the outside.

A plurality of support shafts 97 extend between the side walls 95a in the back-and-forth direction. A fixed wheel 98 having a large width is rotatably supported by each support shaft 97. Flanges 98a are formed on the two end portions of the fixed wheel 98. A channel-like back-and-forth movement rail 99 is placed on the fixed wheels 98 to be movable back and forth.

More specifically, a bottom wall 99a of the back-and-forth movement rail 99 is in contact with the outer circumferential surfaces of the fixed wheels 98 while the rails 99 open upward. Right and left side walls 99b of the back-and-forth movement rail 99 are bent upward from the bottom wall 99a at the rise portions where the right and left flanges 98a of the fixed wheel 98 project.

The upper end portions of the right and left side walls 99b are bent outward at a position lower than the upper walls 91c of the fixed rails 91, thus forming flanges 99c. Note that the distal end portions of the flanges 99c are bent downward.

A plurality of longitudinally elongated holes 99d are formed in the right and left side walls 99b of the back-and-forth movement rail 99 in the back-and-forth direction such that those in one side wall oppose those in the other side wall. Pins 100 extend through the elongated holes 99d formed in the right and left side walls 99b to be vertically movable.

A flexible tube 101 is accommodated in the channel of the back-and-forth movement rail 99 such that it rests on the bottom wall 99a of the back-and-forth movement rail 99. A channel-like vertical movement rail 102 is loosely inserted in the channel of the back-and-forth movement rail 99 and on the flexible tube 101.

A bottom wall 102a of the vertical movement rail 102 opposes the bottom wall 99a of the back-and-forth movement rail 99 through the flexible tube 101. The vertical movement rail 102 is loosely inserted in the back-and-forth movement rail 99 such that its right and left side walls 102b are slightly separated from the inner sides of the right and left side walls 99b of the back-and-forth movement rail 99. Therefore, the vertical movement rail 102 can move upward/downward with respect to the back-and-forth movement rail 99.

The upper end portions of the right and left side walls 102b of the vertical movement rail 102 are bent outward to form goods rest plates 102c. The lowest position of the vertical movement rail 102 is determined when the goods rest plates 102c abut against the flanges 99c of the back-and-forth movement rail 99.

The two end portions of each pin 100 extending through the right and left side walls 102b of the vertical movement rail 102 are loosely inserted in the elongated holes 99d formed in the right and left side walls 99b of the back-and-forth movement rail 99. Therefore, the vertical movement rail 102 moves vertically as the pins 100 are guided by the elongated holes 99d.

In this case, when the vertical movement rail 102 moves upward, its goods rest plates 102c reach a position higher than the upper walls 91c of the fixed rails 91. The vertical movement rail 102 moves upward until the pins 100 abut against the upper edge portions of the elongated holes 99d.

The upwardly open channel opening of the vertical movement rail 102 is covered with a cover member 103 having a U-shaped section. Since the right and left back-and-forth movement rails 99 are coupled to each other with the horizontal brace, the push-pull rod, and the like, as described above, they are stably located on the fixed wheels 98, so that they will not derail.

According to the second embodiment described above, the back-and-forth movement rail 99 is moved back and forth together with the flexible tube 101 and the vertical movement rail 102 by a reciprocally driving means, e.g., the air cylinder 31, and the vertical movement rail 102 is moved vertically by inflation/deflation of the flexible tube 101.

In the same manner as in the first embodiment, the flexible tube 101 need not lift the back-and-forth movement rail 99. The pneumatic pressure can be decreased accordingly. Hence, the flexible tube 101 does not need specific materials or structures that withstand high-pressures to simplify the arrangement, which is economically advantageous.

In this second embodiment, since the fixed rails 91 are installed separately from the back-and-forth movement rails 99 and the vertical movement rails 102, the assembly can be facilitated. In particular, the back-and-forth movement rails 99 need only be placed on the fixed wheels 98 attached to the fixing support frames 95 to be movable back and forth, thus facilitating the assembly.

Furthermore, the flexible tube 101 is arranged between the back-and-forth movement rail 99 and the vertical movement rail 102. In this case, since the flexible tube 101 is placed on the bottom wall 99a of the back-and-forth movement rail 99, thereafter the vertical movement rail 102 is loosely inserted in the back-and-forth movement rail 99, and the pins 100 are set to extend through the vertical movement rail 102 from a side portion, the assembly is facilitated very much.

Figure 18:
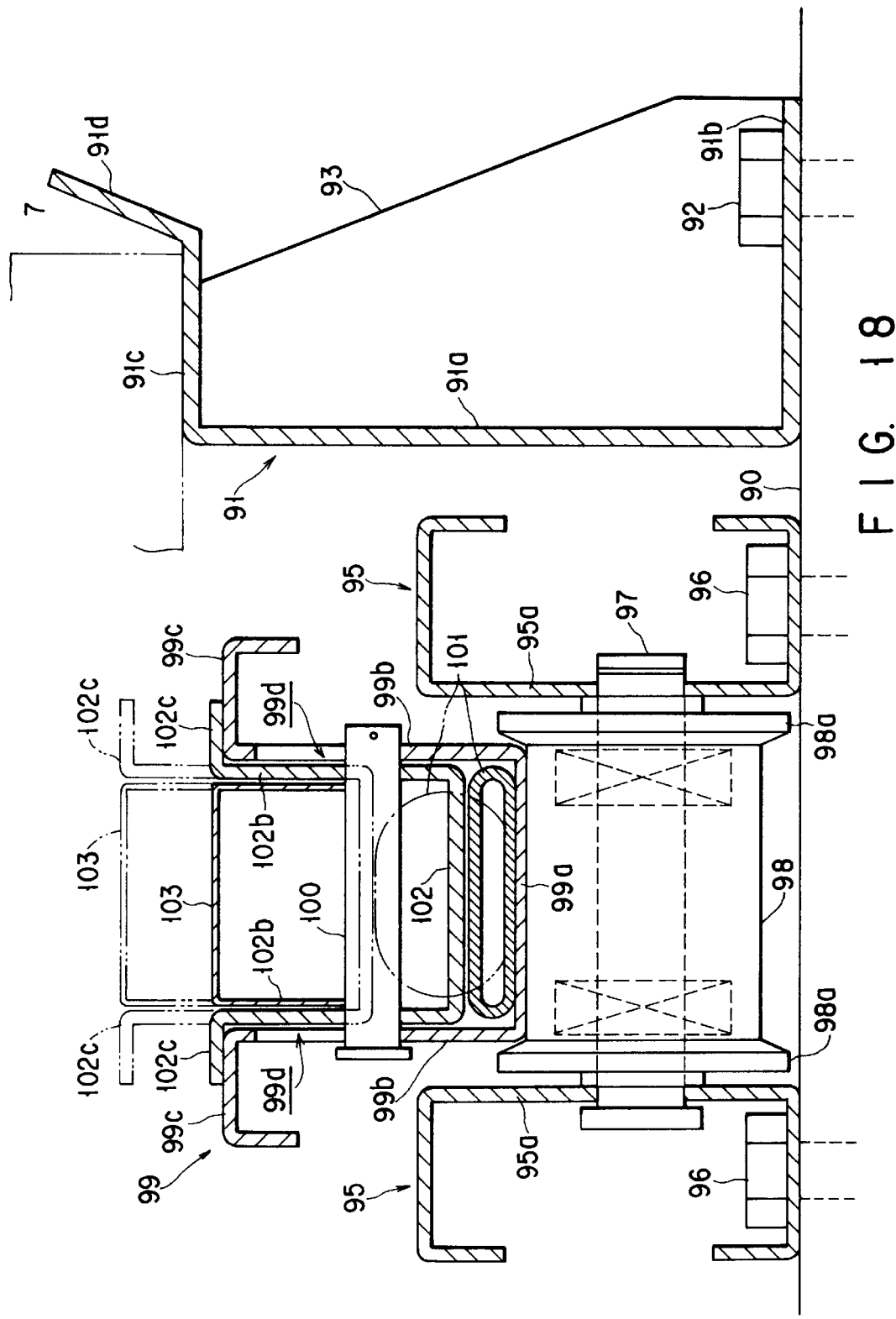
FIG. 18 is a sectional view showing an example in which side guides are added to the fixed rails of the second embodiment.

When an ordinary pallet is to be transferred and the lane 6 is long, the outer sides of upper walls 91c of right and left fixed rails 91 can be respectively formed with side guides 91d for guiding the right and left sides of a distribution pallet 7, as shown in FIG. 18.

The side guides 91d are formed on the outer sides of the upper walls 91c of the right and left fixed rails 91 to extend along the entire length of the upper walls 91c. The two side guides 91d rise with such an inclination that they open from the lower portion upward when seen from the front side.

As has been described above, according to the present invention, since the flexible tube is mounted on the back-and-forth movement rail to vertically move the vertical movement rail, the back-and-forth movement rail need not be lifted. Thus, no specific members or structures that withstand high-pressures are required, thereby decreasing the cost.

The reciprocally driving means is fixed to a member integrally with a member that supports the back-and-forth movement rail to be movable back and forth and drives the back-and-forth movement rail. Thus, a specific link member or the like is not needed, and the driving force can be transmitted efficiently. When an air cylinder is used as the reciprocally driving means, the supply source of the compressed air that inflates and deflates the flexible tube can be used commonly with the air cylinder, which is convenient and can decrease the number of components.

The goods transfer lane having the back-and-forth movement rails, the reciprocally driving means, the vertical movement rails, and the flexible tube is formed as a deep row. A plurality of goods transfer lanes each having this arrangement are arranged vertically and horizontally to constitute a flowthrough rack, so that a large number of goods items can be stored. Thus, a flow-through rack which has a small number of components, can be assembled easily, and allows a smooth operation can be provided at a low cost.

The control computer performs control for intermittently moving the goods forward and control for intermittently moving the goods backward, and loads/unloads the goods from one bay surface, so that a first-in, last-out flow-through rack is provided. The horizontal goods transfer apparatus has a mode selection switch for switching the goods transfer direction. The control computer selectively sets the forward mode for moving the goods forward and the backward mode for moving the goods backward in accordance with the switching operation of the mode selection switch. As a result, loading and unloading can be freely performed whenever necessary.

Additional advantages and modifications will readily occur to those skilled in the art. Therefore, the invention in its broader aspects is not limited to the specific details, and representative embodiments shown and described herein. Accordingly, various modifications may be made without departing from the spirit or scope of the general inventive concept as defined by the appended claims and their equivalents.

What is claimed is:

1. A horizontal goods transfer apparatus comprising:
   a horizontal fixed rail extending in a back-and-forth direction and capable of mounting thereon a plurality of items in a row in a longitudinal direction thereof;
   a back-and-forth movement rail arranged to be substantially parallel to said fixed rail and placed to be reciprocally movable in the back-and-forth direction;
   reciprocating driving means for moving said back-and-forth movement rail in the back-and-forth direction for a predetermined distance;
   a vertical movement rail supported by said back-and-forth movement rail to be vertically movable and capable of being located at an upper position higher than a top surface of said fixed rail and a lower position lower than said fixed rail;
   a flexible tube placed on said back-and-forth movement rail and under said vertical movement rail to extend along said vertical movement rail and being inflated/deflated upon supply/discharge of compressed air, thereby vertically moving said vertical movement rail to and from the upper and lower positions;
   compressed air supplying/discharging means for supplying/discharging the compressed air to/from said flexible tube; and
   means for controlling said compressed air supplying/discharging means and said reciprocating driving means to combine a vertical movement of said vertical movement rail and a reciprocal movement of said back-and-forth movement rail, thereby intermittently transferring the items in the back-and-forth direction.

2. The apparatus according to claim 1, further comprising:
   a tube that causes said flexible tube and said compressed air supplying/discharging means to communicate with each other such that a portion midway thereof coils to form a loop with a size that changes when said back-and-forth movement rail moves.

3. The apparatus according to claim 2, wherein said back-and-forth movement rail is formed as a channel which is open upward, said flexible tube being placed on a bottom surface of said back-and-forth movement rail, and said vertical movement rail being set in said back-and-forth movement rail and above said flexible tube.

4. The apparatus according to claim 3, further comprising:
   an axle rotatably extending through two opposing side walls of said back-and-forth movement rail, such that when wheels set on two end portions of said axle roll on a horizontal surface formed on said fixed rail, said back-and-forth movement rail reciprocally moves in the back-and-forth direction.

5. The apparatus according to claim 4, wherein said vertical movement rail is formed with vertically elongated holes through which said axle is loosely inserted, such that said vertical movement rail can move vertically.

6. The apparatus according to claim 3, wherein said back-and-forth movement rail is mounted on a fixed wheel rotatably supported by fixing support frames formed in a longitudinal direction of said back-and-forth movement rail, so as to move reciprocally in the back-and-forth direction.

7. The apparatus according to claim 1, wherein said reciprocating driving means is an air cylinder, and said air cylinder and said compressed air supplying/discharging means commonly use one pneumatic source.

8. The apparatus according to claim 1, wherein said controlling means moves said vertical movement rail upward to lift an item placed on said fixed rail with said vertical movement rail;
   moves said back-and-forth movement rail subsequently forward or backward for a predetermined distance, thereby transferring the item together with said vertical movement rail; and
   moves said vertical movement rail subsequently downward to transfer the item on said vertical movement rail onto said fixed rails.

* * * * *

UNITED STATES PATENT AND TRADEMARK OFFICE
CERTIFICATE OF CORRECTION

PATENT NO. : 5,868,541

DATED : February 9, 1999

INVENTOR(S) : Empei Tajima et al.

It is certified that error appears in the above-identified patent and that said Letters Patent is hereby corrected as shown below:

Cover page, left col., line 7, change "Usiku" to --Ushiku--.

Col. 1, line 15, change "applicant" to --applicants--.

Col. 3, line 49 change "long" to --far--; and line 59, after "6," insert --as viewed by looking at FIGS. 1 and 2 together--.

Col. 4, line 3, change "Stoppers" to --As seen at both ends of FIG. 2, stoppers--;

line 6, change "A" to --Referring to FIGS. 3 and 4, a --;

line 9, change "An" to --Returning to FIG. 6, an --;

line 11, change "are" to --is--;

line 17, after "roll" insert --when--;

line 27, change "The" to --Returning once again to FIG. 6, the --; and line 63, after "to" insert --a position--.

Col. 5, line 7, change "dashes" to --dashed--;

line 16, after "7" insert --of FIG. 1--;

line 17, after "10" insert --in FIG 6--;

line 45, after "L-shaped" insert --cross--;

line 48, change "Horizontal" to --As best seen in FIG. 7, horizontal--; and line 51, delete "the".

Col. 6, line 55, after "of" insert --its--.

UNITED STATES PATENT AND TRADEMARK OFFICE
CERTIFICATE OF CORRECTION

PATENT NO. : 5,868,541
DATED : February 9, 1999
INVENTOR(S) : Empei Tajima et al.

It is certified that error appears in the above-identified patent and that said Letters Patent is hereby corrected as shown below:

Col. 7, line 17, after "59" but before the period, insert --, as seen only in FIG. 11--; and line 24, after "forward" insert --to--; and after "backward" insert --from--.

Col. 8, line 19, after "31a" but before the semicolon, insert --of FIG. 3--;

line 25, after "12" but before the period, insert --, as seen previously in FIG. 3--;

line 26, change "The" to --Returning to FIG. 14, the--;

line 33, after "position" but before the period, insert --shown in FIG. 6--;

line 36, after "position" but before the period, insert --also shown in FIG. 6--;

line 37, change "The" to --Returning once again to FIG. 14, the--;

line 56, after "disposed" but before the period, insert --adjacent thereto--;

line 57, change "The" to --In FIG. 14, the--;

line 58, after "7" insert --of FIG. 2--;

line 60, after "83" insert --of FIG. 14--;

line 62, change "sensors, e.g." to --detectors 82 and 83--; and line 65, after "described" but before the period, insert --with reference to FIG. 1--.

UNITED STATES PATENT AND TRADEMARK OFFICE
CERTIFICATE OF CORRECTION

PATENT NO. : 5,868,541
DATED : February 9, 1999
INVENTOR(S) : Empei Tajima et al.

It is certified that error appears in the above-identified patent and that said Letters Patent is hereby corrected as shown below:

Col. 9, line 1, after "44" insert --of FIG. 3--;

line 6, after "10" but before the period, insert --in FIG. 6--;

line 7, after "83" insert --of FIG. 14--;

line 11, after "44c" insert --of FIG. 6--;

line 15, after "80" insert --of FIG. 14--;

line 17, after "12" insert --of FIG. 3--;

line 23, after "80" insert --of FIG. 14--;

line 26, after "44" insert --of FIG. 3--;

line 30, after "44" insert" --in FIG. 6--;

line 32, after "80" insert --of FIG. 14--;

line 35, after "12" insert --of FIG. 3--; delete "back-and-forth movement";

line 43, after "6" but before the comma, insert --of FIG. 1--;

line 44, after "44" insert --of FIG. 3--;

line 48, after "6" insert --of FIG. 1--;

line 54, after "manner," insert --as seen in FIG. 2,--;

line 57, after "82" insert --of FIG. 14--;

line 59, after "7" insert --in FIG. 2--; and line 60, after "83" insert --of FIG. 14--.

UNITED STATES PATENT AND TRADEMARK OFFICE
CERTIFICATE OF CORRECTION

PATENT NO. : 5,868,541
DATED : February 9, 1999
INVENTOR(S) : Empei Tajima et al.

It is certified that error appears in the above-identified patent and that said Letters Patent is hereby corrected as shown below:

Col. 10, line 1, after "44" insert --of FIG. 3--;

line 18, after "83" insert --of FIG. 14--;

line 30, after "12" insert --in FIG. 3--;

line 38, after "43" insert --of FIG. 6--;

line 42, change ", which" to --. Thus, this feature--;

line 44, after "71" insert --of FIG. 14--;

line 47, after "1" insert --of FIG. 1--; and line 58, change "dashes" to --dashed--.

Col. 11, line 18, after "specifically," insert --in FIG. 16--;

line 20, change "are" to --is--;

line 24, change "A" to --As seen in FIG. 17, a--;

line 28, change "A" to --As seen in FIG. 16, a--;

line 29, change "The" to --Returning to FIG. 17, the--;

line 43, change "extend" to --extends--;

line 47, change "A" to "The";

line 61, change "are" to --is--; and line 64, after "wall" insert --99b--.

Col. 12, line 35, change "open" to --extended--;

line 45, change "reciprocally" to --reciprocating--;

UNITED STATES PATENT AND TRADEMARK OFFICE
CERTIFICATE OF CORRECTION

PATENT NO.    : 5,868,541
DATED         : February 9, 1999
INVENTOR(S)   : Empei Tajima et al.

It is certified that error appears in the above-identified patent and that said Letters Patent is hereby corrected as shown below:

line 54, change ", which" to --. This feature--; and line 57, delete "the" (second occurrence).

Col. 13, line 2, after "portion," insert --thus--;

line 21, change "reciprocally" to --reciprocating--;

line 27, change "reciprocally" to --reciprocating--;

line 29, change ", which" to --. This arrangement--;

line 32, change "reciprocally" to --reciprocating--;

line 34, delete "goods";

line 35, change "are" to --is--;

line 37, delete "goods";

line 39, delete "can be";

line 41, after "and" insert --also performs--;

line 42, change ", and" to --. Thus, it--; and line 53, delete ",".

Signed and Sealed this

Fourth Day of April, 2000

*Attest:*

Q. TODD DICKINSON

*Attesting Officer*      *Director of Patents and Trademarks*